(12) United States Patent
Matsuo et al.

(10) Patent No.: US 12,131,196 B2
(45) Date of Patent: Oct. 29, 2024

(54) DISTRIBUTED PROCESSING SUPPORT APPARATUS, DISTRIBUTED PROCESSING SUPPORT METHOD, AND PROGRAM

(71) Applicant: NIPPON TELEGRAPH AND TELEPHONE CORPORATION, Tokyo (JP)

(72) Inventors: Kazuya Matsuo, Musashino (JP); Masahiro Yoshida, Musashino (JP); Koya Mori, Musashino (JP); Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 587 days.

(21) Appl. No.: 17/414,834

(22) PCT Filed: Nov. 1, 2019

(86) PCT No.: PCT/JP2019/043067
§ 371 (c)(1),
(2) Date: Jun. 16, 2021

(87) PCT Pub. No.: WO2020/129432
PCT Pub. Date: Jun. 25, 2020

(65) Prior Publication Data
US 2022/0068126 A1    Mar. 3, 2022

(30) Foreign Application Priority Data

Dec. 21, 2018  (JP) ................................. 2018-240059

(51) Int. Cl.
*G06F 9/48*     (2006.01)
*G06F 8/35*     (2018.01)
(Continued)

(52) U.S. Cl.
CPC .............. *G06F 9/5077* (2013.01); *G06F 8/35* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/5027;
(Continued)

(56) References Cited

U.S. PATENT DOCUMENTS 9,542,219 B1 * 1/2017 Bryant .................. G06F 9/5077
11,461,669 B2 * 10/2022 von Trapp ............... G06N 7/01
(Continued)

FOREIGN PATENT DOCUMENTS

| JP | H06-75786 A | 3/1994 |
|---|---|---|
| JP | 2005-173788 A | 6/2005 |
| JP | 2017-143365 A | 8/2017 |

OTHER PUBLICATIONS

Alex Reznik, et al., "Developing Software for Multi-Access Edge Computing," ETSI White Paper, No. 20, Sep. 2017.
(Continued)

*Primary Examiner* — Charles M Swift

(57) ABSTRACT

A technique for efficiently determining the optimal deployment for the application distribution processing can be offered. A distributed processing support apparatus configured to support distributed processing of an application on a plurality of information processing devices includes a source code acquisition unit configured to acquire a source code of the application; a source code partition unit configured to partition the source code into a plurality of logics; a candidate extraction unit configured to extract, based on a processing order of the logics of the application, information relating to the operational environments of the information
(Continued)

processing devices, deployment pattern candidates of the logics which are to be deployed in a distributed manner to any of the information processing devices; and an optimal pattern determination unit configured to determine an optimal deployment pattern from the extracted deployment pattern candidates.

10 Claims, 14 Drawing Sheets

(51) Int. Cl.
  *G06F 9/455* (2018.01)
  *G06F 9/50* (2006.01)
  *G08G 1/01* (2006.01)
(52) U.S. Cl.
  CPC .......... *G06F 9/4843* (2013.01); *G06F 9/4881* (2013.01); *G06F 9/50* (2013.01); *G06F 9/5027* (2013.01); *G06F 9/5038* (2013.01); *G06F 9/5044* (2013.01); *G06F 9/505* (2013.01); *G06F 9/5083* (2013.01); *G08G 1/0133* (2013.01); *G08G 1/0141* (2013.01); *G08G 1/0145* (2013.01)
(58) Field of Classification Search
  CPC ...... G06F 9/5038; G06F 9/5044; G06F 9/505; G06F 9/5077; G06F 9/5083
  See application file for complete search history.

(56) References Cited

U.S. PATENT DOCUMENTS

| | | | |
|---|---|---|---|
| 2005/0125772 A1 | 6/2005 | Kohno | |
| 2013/0097293 A1* | 4/2013 | Gibson | G06F 9/5044 709/221 |
| 2014/0282563 A1* | 9/2014 | Jacobson | G06F 9/5066 718/102 |
| 2015/0052530 A1* | 2/2015 | Jacobson | G06F 9/46 718/102 |
| 2018/0081719 A1* | 3/2018 | Baldwin | G06F 9/5027 |
| 2018/0152361 A1* | 5/2018 | Chu | H04L 41/0896 |

OTHER PUBLICATIONS

Jieyao Liu, et al., "Application Partitioning Algorithms in Mobile Cloud Computing: Taxonomy, Review and Future Directions," Journal of Network and Computer Applications, vol. 48, 2015.
IBM ILOG CPLEX, [online], Internet URL :http://www.ilog.com/products/cplex/, Nov. 6, 2018.
Verbelen, Tim, et al., "Graph partitioning algorithms for optimizing software deployment in mobile cloud computing," Future Generation Computer Systems, vol. 29, No. 2, pp. 451-459, 2013.
International Search Report issued in PCT/JP2019/043067 (in English and Japanese), mailed on Feb. 4, 2020.

* cited by examiner

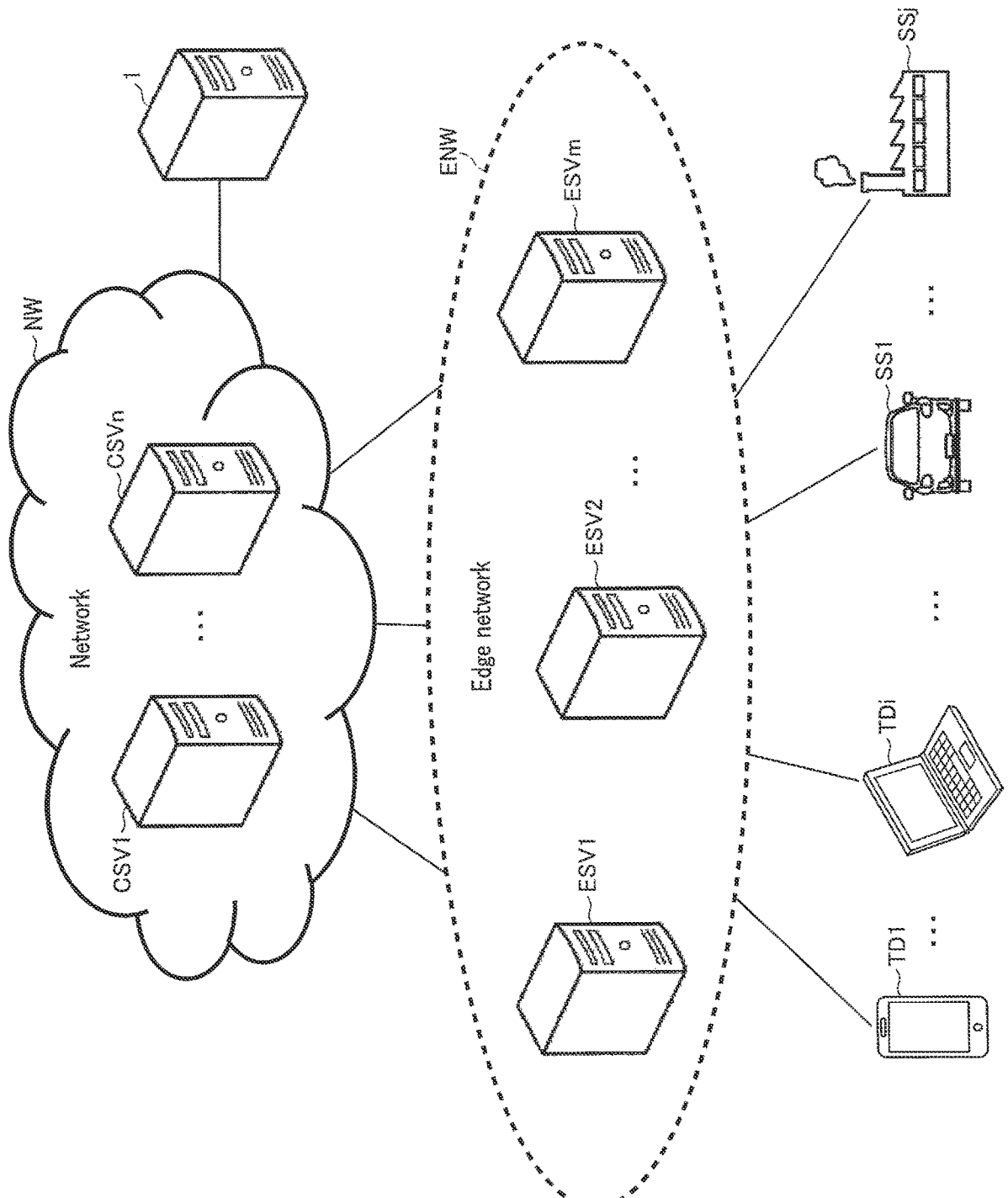
F I G. 1

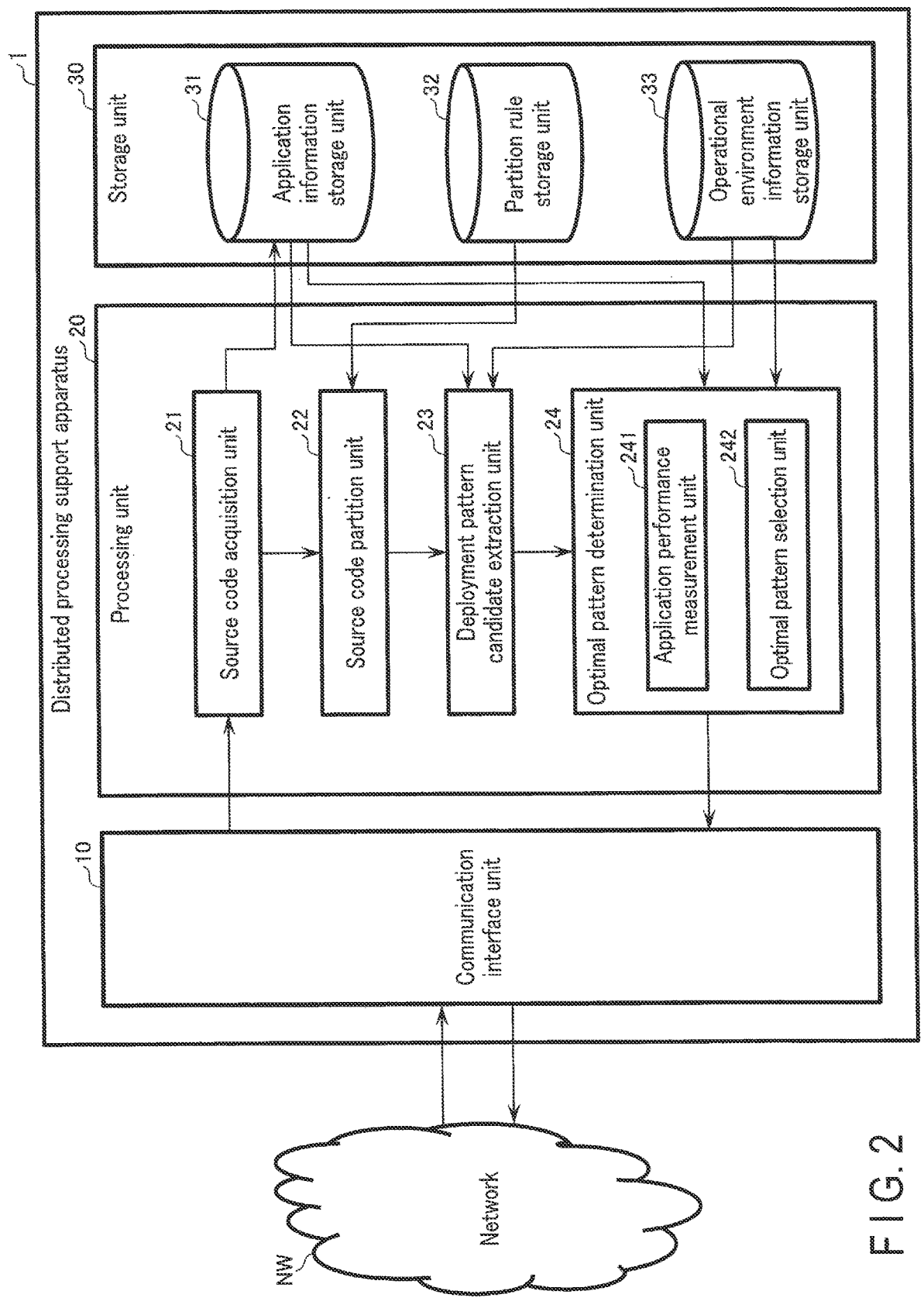
F I G. 2

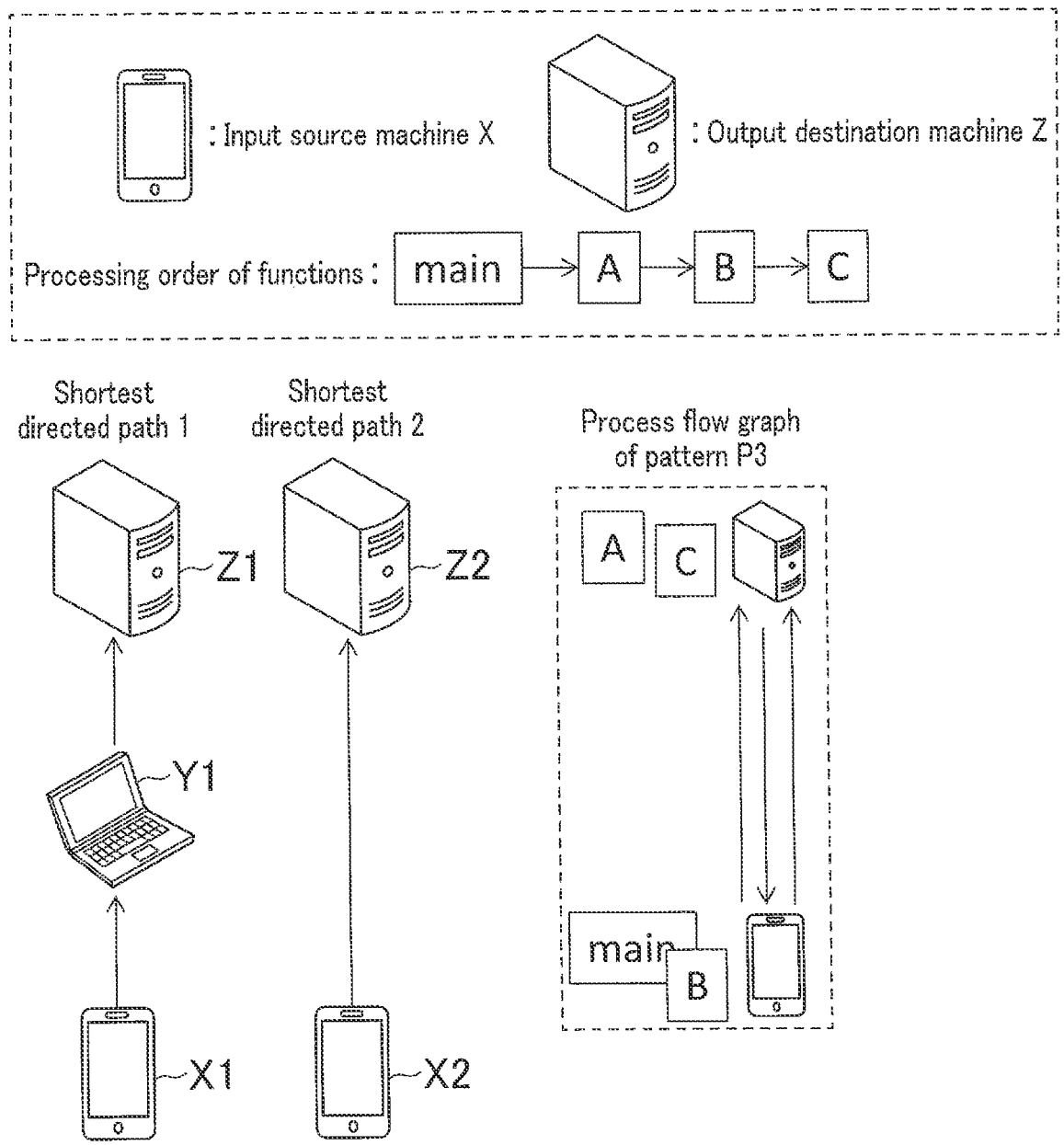
F I G. 5

1  $D \leftarrow NULL$
2  $N \leftarrow |M| - |M_{IO}|$
3  for $i = 0$ to $N$ do
4    $comb(M - M_{IO}, i)$
5    $M_{IO}$ is added to each combination in the result of $comb(M - M_{IO}, i)$
6    $MC_i \leftarrow$ Combinations calculated in the above procedure
7    $EC_i \leftarrow comb(E, i + 1)$
8    $LC_i \leftarrow$ Combinations of logic groups into which $L$ is split based on $EC_i$
9    Calculating direct product of $MC_i$ and $LC_i$ under the condition: each logic in $L_{IO}$ can be deployed only to machines in $M_{IO}$
10   $D \leftarrow D +$ the result of the above procedure
11 End for

F I G. 8

| Symbol | Description |
|---|---|
| $M = \{m_1, m, ..., m_n\}$ | Deployment candidate machine group (sorted in computational capability order) |
| $M_{IO}$ | Input source machine and output destination machine |
| $L = \{l_1, l_2, ...\}$ | Logic group (sorted in processing order) |
| $L_{IO}$ | Logic group including data input/output processing |
| $E = \{e_1, e_2, ...\}$ | Edge of graph (data-flow graph) connecting logics by directed edges in processing order |
| $MC = \{MC_1, MC_2, ..., MC_i, ...\}$ | Set of combinations when the number i of machines are selected for deployment of logics |
| $EC = \{EC_1, EC_2, ..., EC_i, ...\}$ | Set of combinations when the number i of edges are selected for data-flow graph |
| $LC = \{LC_1, LC_2, ..., LC_i, ...\}$ | Set of combinations when logic is partitioned into the number i of logics in processing order |
| $D = \{D_1, D_2, ...\}$ | Set of deployment patterns extracted according to present technique |

FIG. 9

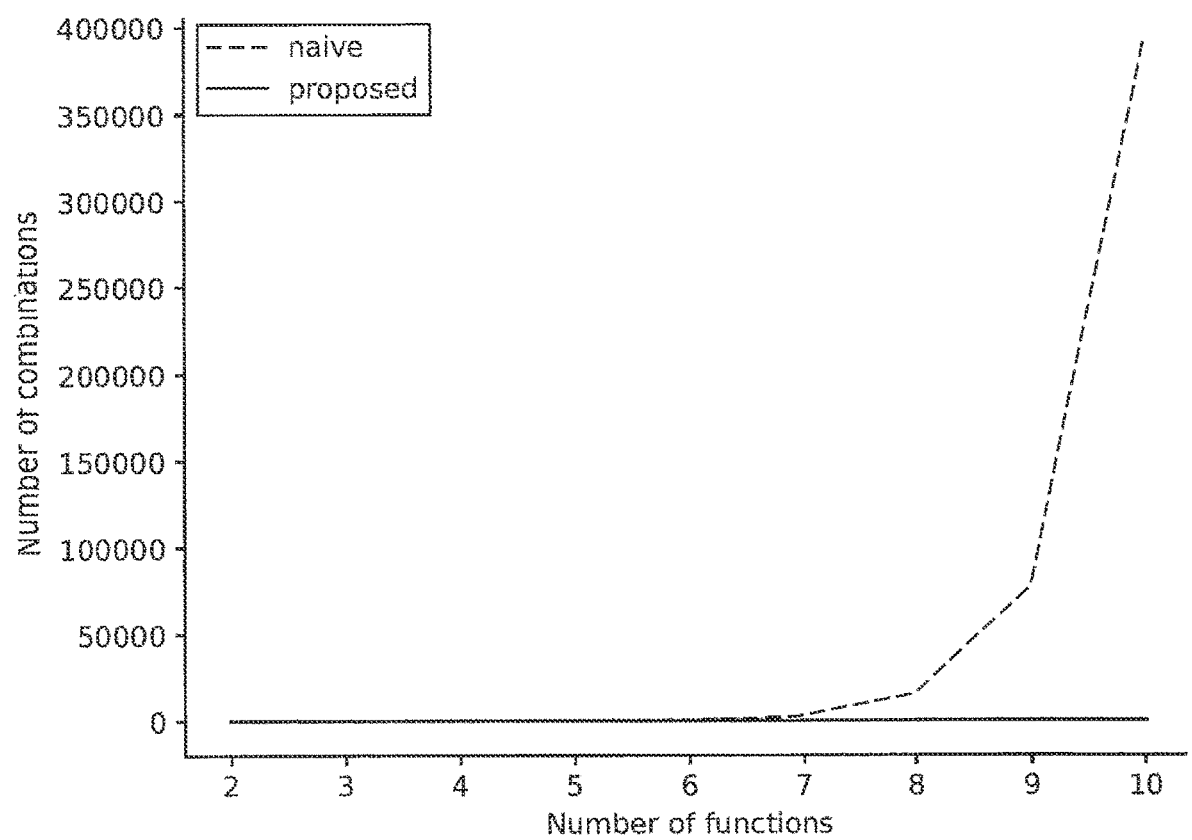
F I G. 13

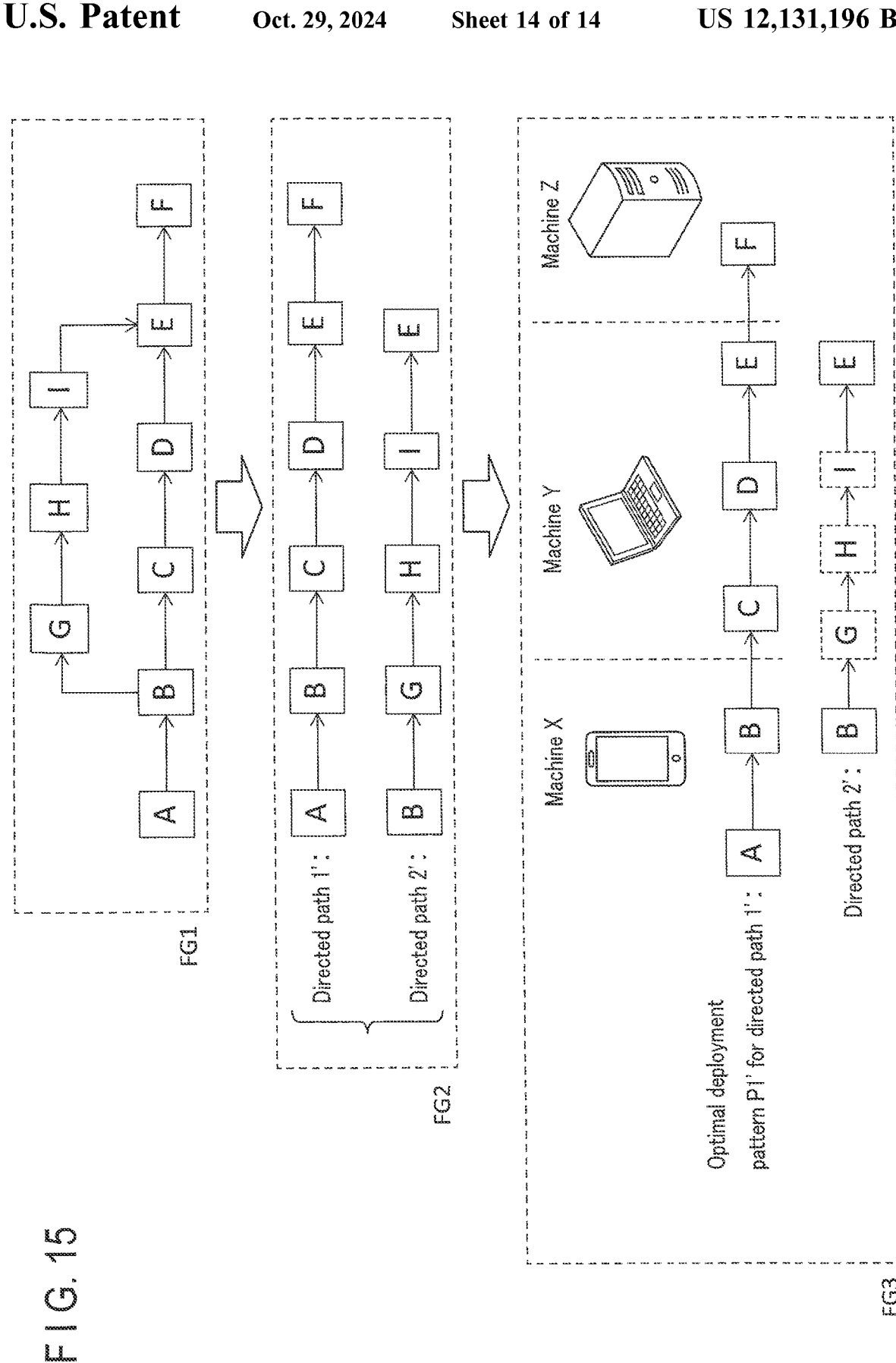

DISTRIBUTED PROCESSING SUPPORT APPARATUS, DISTRIBUTED PROCESSING SUPPORT METHOD, AND PROGRAM

CROSS-REFERENCE TO RELATED APPLICATIONS

This is a U.S. national phase application under 35 USC 371 of international application PCT/JP2019/043067, (not published in English) filed on Nov. 1, 2019, which claims priority to Japanese patent application No. 2018-240059, filed on Dec. 21, 2018. The entire disclosures of the above applications are incorporated herein by reference.

FIELD

An aspect of the present invention relates to a distributed processing support apparatus for supporting distributed processing of an application on multiple information processing devices, a distributed processing support method, and a program.

BACKGROUND

With the recent development of Internet-of-Things (IoT) technologies, various kinds of familiar devices have become accessible to the Internet, which makes it easier to collect and utilize information acquired by these devices.

With this in the background, expectations are increasing for distributed applications, in which multiple application logic operations (which denote a kind of processing performed upon input data to output data; hereinafter simply referred to as "logics") such as functions and classes are deployed to and executed on geographically distributed machines in order to enhance the information acquisition efficiency and response time reduction.

For instance, through deployment of a logic for aggregating information transmitted from IoT devices in relay servers, the amount of communication required for information acquisition can be reduced. In addition, through deployment of a logic that carries out frequent communications with user terminals in a server geographically adjacent to the users of the application, the application response time can be reduced.

In order to execute an application in a distributed manner among multiple machines, the application needs to be partitioned into multiple logic operations and deployed to multiple machines (see Non-patent Literature 1, for example).

The performance of the application varies greatly depending on how the application is partitioned and how it is deployed. Such a variation is produced because the communications among logics need to be performed through communications among machines and also because the logic processing time is highly dependent on the performance of the machine that executes this logic. For this reason, to maximize the application performance, the technique for determining the optimal partition and deployment of the application is desired.

In order to determine the optimal deployment, it is common practice to Convert the optimization problem to a linear programming problem having an objective function for the optimization of the application performance (factors relating to the traffic of machines, throughputs, processing time and the like), and to calculate the optimal solution for the optimal deployment. If the to-be-partitioned application or its operational environment is of a massive scale, however, the possible deployment patterns will be increased to an enormous number, which will make it impossible to calculate the optimal solution in real time. For instance, if 100 operations are obtained after the partition, and 3 machines are available as deployment candidates, there will be $5.2 \times 10^{47}$ possible deployment patterns.

To solve such a problem, a technique of employing an approximate method such as simulated annealing or a genetic algorithm has been known (see Non-patent Literature 2, for example). The approximate method limits the deployment patterns to be explored, which realizes acquisition of a solution to the application deployment in a reduced time in comparison with a method of simply exploring all the deployment patterns. According to such application partition and deployment, the functions defined in the source code of the application are first partitioned as one logic, and thereafter, possible deployment patterns of the deployment candidate machines and functions are calculated, from which an approximate solution (quasi-optimal solution) of the deployment pattern that can deliver the highest application performance is selected.

Specifically, according to the above conventional technique, logics (e.g., functions and classes) are first identified from the input source code, and the source code is partitioned in accordance with these logics. Multiple combination patterns of the logics and deployment candidate machines are thereby created. Thereafter, the application performance of each deployment pattern is measured. For instance, the partitioned logics may be installed and repeatedly executed on the respective machines in accordance with each deployment pattern to determine the average time period required for the entirety of the processing to be the processing time of the function, or in other words the performance value of the deployment pattern. Based on the obtained performance value, an optimization problem such as the linear programming problem (see Non-patent Literature 3, for example) is solved with an approximate method such as simulated annealing and a genetic algorithm so that the deployment of logics that can deliver a high performance in the desired processing can be calculated. For instance, when the optimal solution is defined as "a deployment pattern that reduces the machine traffic most among the deployment patterns demonstrating the processing time of 500 milliseconds or less", an approximate solution of this optimal solution may be calculated based on the communication traffic, the entire processing time, and network delay among machines in each deployment pattern.

CITATION

Non-Patent Literature

Non-patent Literature 1 Alex Reznik, et al., "Developing Software for Multi-Access Edge Computing," ETSI White Paper, No. 20, September 2017.

Non-patent Literature 2 Jieyao Liu, et. al., "Application Partitioning Algorithms in Mobile Cloud Computing: Taxonomy, Review and Future Directions," Journal of Network and Computer Applications, vol. 48, 2015.

Non-patent Literature 3 IBM ILOG CPLEX, [online], Internet <URL:http://www.ilog.com/products/cplex/>

SUMMARY

Technical Problem

With the above-discussed conventional technique, an approximate solution of the deployment pattern that can deliver the highest application performance may be calculated at high speed. With the conventional technique adopting an approximate method, however, whether or not the solution is indeed optimal is not ensured.

To address this issue, a calculation scheme is required for efficiently calculating an application deployment without overlooking the optimal solution.

The present invention has been conceived in light of the above circumstances. The invention, aims to offer a technique for efficiently determining the optimal deployment for the application distribution processing.

Solution to Problem

To provide an answer to the above problem, a distributed processing support apparatus according to the first aspect of the present invention, which is configured to support distributed processing of an application on a plurality of information processing devices, includes a source code acquisition unit configured to acquire a source code of the application; a source code partition unit configured to partition the source code into a plurality of logics; a candidate extraction unit configured to, based on a processing order of the logics of the application and information concerning operational environments of the information processing devices, extract deployment pattern candidates of the logics which are to be deployed in a distributed manner to any of the information processing devices; and an optimal pattern determination unit configured to determine an optimal deployment pattern from the extracted deployment pattern candidates.

Advantageous Effects of Invention

According to the first aspect of the invention, a distributed processing support apparatus for assisting the application distribution processing on the multiple information processing devices partitions the source code of the application into multiple logics, extracts candidate deployment patterns of the logics to the information processing devices based on the processing order of the partitioned logics and information concerning the operational environment of the information processing devices, and determines the optimal deployment pattern from these candidates. Since deployment pattern candidates of the partitioned logics are extracted before determining the optimal deployment pattern, the determination of the optimal deployment pattern can be efficiently made in comparison with the determination of the optimal solution from the deployment patterns for all the possible combinations.

That is, according to the present invention, the technique for efficiently determining the optimal deployment for the application distribution processing can be offered.

BRIEF DESCRIPTION OF THE DRAWINGS

FIG. 1 is a schematic diagram showing an exemplary system including a distributed processing support apparatus according to an embodiment of the present invention.

FIG. 2 is a block diagram showing a functional configuration of the distributed processing support apparatus according to the embodiment of the present invention.

FIG. 5 is a diagram showing an image of a directed graph used for extraction of deployment pattern candidates performed by the distributed processing support apparatus illustrated in FIG. 2.

FIG. 8 is a diagram showing an exemplary algorithm used for extraction of a deployment pattern candidate by the distributed processing support apparatus illustrated in FIG. 2.

FIG. 9 is a diagram explaining the symbols used in the algorithm of FIG. B.

FIG. 13 is a diagram showing comparative results of the number of deployment patterns to be explored for optimal exploration in an experiment conducted on the distributed processing support apparatuses according to the conventional technique and the present embodiment.

FIG. 15 is a diagram for applying the distributed processing support apparatus according to the present embodiment to the data-flow graph including a closed path.

DETAILED DESCRIPTION

Figure 3:
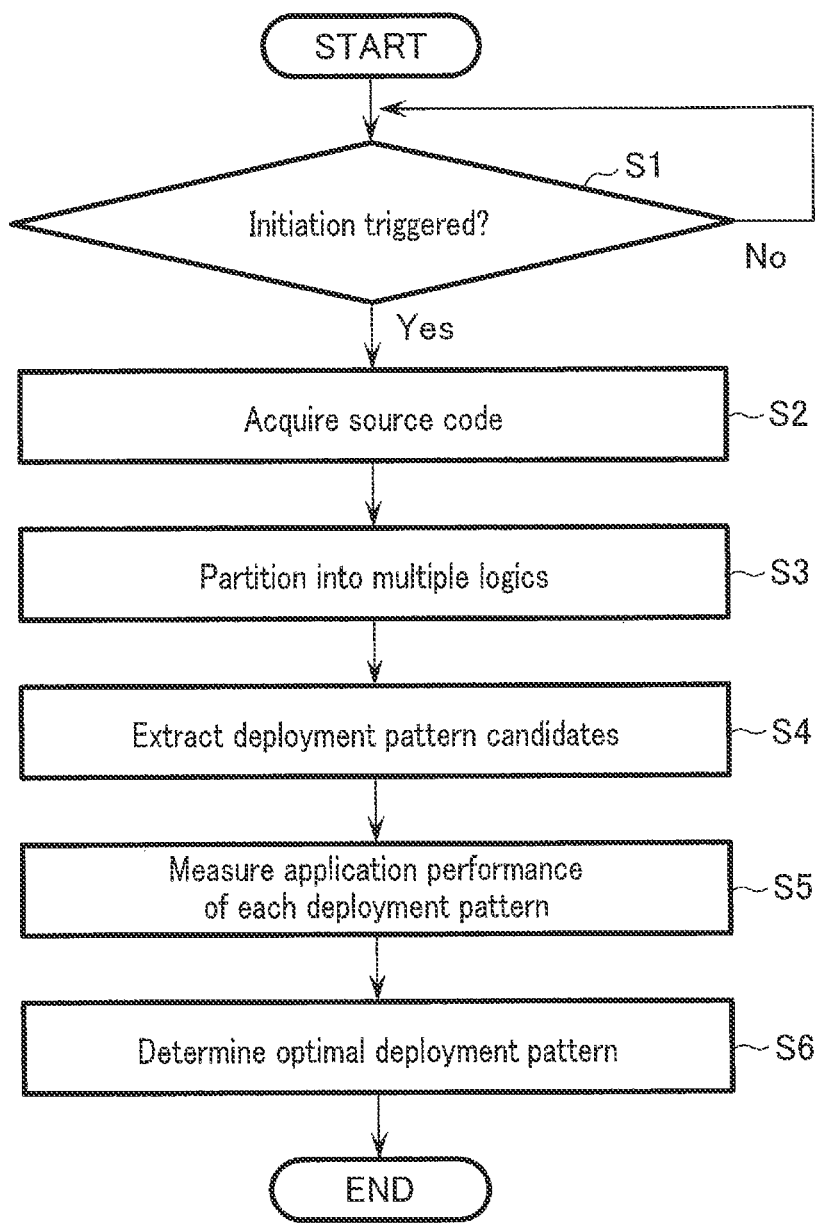
FIG. 3 is a flowchart of the procedure and description of the processing performed by the distributed processing support apparatus illustrated in FIG. 2.

Embodiments of the present invention will be described below with reference to the drawings.

First Embodiment (Configuration)
(System Configuration)

FIG. 1 is a schematic diagram showing an exemplary system including a distributed processing support apparatus according to an embodiment of the present invention.

The system includes terminal devices TDI to TDi (hereinafter they may also be referred to as "terminal devices TD" without differentiating between them), which serve as data collection source machines or input source machines, and sensors SS1 to SSj (hereinafter they may also be referred to as "sensors SS" without differentiating between them); multiple cloud servers CSV1 to CSVn (hereinafter they may also be referred to as "cloud servers CSV" without differentiating between them), which acquire data from these devices via a network NW; multiple edge servers ESV1 to ESVm (hereinafter they may also be referred to as "edge servers ESV" without differentiating between them) arranged between the terminal devices TD/sensors SS and the cloud servers CSV; and a distributed processing support apparatus 1 according to the present embodiment communicable with these devices via a network NW.

The network NW may include a public network such as the Internet and an access network for accessing this public network. The access network also includes an edge network ENW for mutually connecting the edge servers ESV. The edge network ENW may be formed by a local area network (LAN) or wireless LAN. The edge server ESV may bypass an edge network ENW to be directly connected to the Internet.

The terminal devices are information processing devices with a communication function, such as smartphones and personal computers, which can use cloud applications by way of one or more edge servers ESV. The sensors SS include automobiles and other IoT devices. The sensing data measured or detected by a sensor SS is transmitted through a wireless interface adopting a power-saving wireless data communication protocol such as a LAN, wireless LAN, or Bluetooth (trademark), or through a terminal device TD, to an edge server ESV preset as a transmission destination. The terminal devices TD and sensors SS are illustrated merely as examples. They may be stationary or mobile, and may include various numbers and types of devices. The terminal devices TD and Sensors SS do not always need to pass through an edge server ESV or edge network ENW, but may directly access a cloud server CSV through the network NW.

An edge server ESV constitutes a small-scale data center positioned near the user in comparison with a cloud environment expanded on a large-scale data center, and includes various types of information processing devices such as server computers and personal computers.

A cloud server CSV is formed by an information processing device such as a cloud computer, receiving and storing sensing data transmitted from the edge servers ESV through the network NW.

The cloud server CSV offers applications available in the cloud environment. The applications provided by the cloud servers CSV include distribution applications. A distribution application can be processed in a distributed manner by any number of edge servers ESV and terminal devices TD in addition to the cloud server CSV.

The distributed processing support apparatus 1 may be a server computer or personal computer operable by a system manager to determine the deployment of such a distribution application and thereby assist the application distributed processing.

FIG. 2 illustrates a functional configuration of the distributed processing support apparatus 1 of FIG. 1 according to the embodiment.

The distributed processing support apparatus 1 includes a communication interface unit 10, a processing unit 20, and a storage unit 30.

The communication interface unit 10 may include a wired or wireless interface, enabling information transmission/reception through the network NW with a cloud server CSV, an edge server ESV, or a terminal device TD.

For the storage unit 30, a nonvolatile memory such as a hard disk drive (HDD) or a solid state drive (SSD), on which write and read operations can be performed at any time, may be adopted as a storage medium. As the necessary storage regions to realize this embodiment, the storage unit 30 includes an application information storage unit 31, a partition rule storage unit 32, and an operational environment information storage unit 33 in addition to a program storage unit.

The application information storage unit 31 is used for storage of information concerning the distributed processing target application. The application related information may include the processing order of functions in the source code of the application and information concerning the input/output of this application.

The partition rule storage unit 32 is used for storage of rules relating to the partition of an application. The rules relating to the partition of an application are employed to identify partitionable logics, for example based on information concerning the functions defined by the application developers. The rules relating to the partition of the application may be prestored in the partition rule storage unit 32 by a system manager, or may be acquired together with the to-be-partitioned application information through the network NW.

The operational environment information storage unit 33 is used for storage of information concerning the operational environment of information processing devices (which may also be referred to as "machines") that may be involved in the distributed processing. The operational environment information storage unit 33 may store information concerning the computational capabilities, storage regions, present locations and the like of individual machines, which may be input in advance by a system manager. Such information may be updated based on the latest information acquired through the network NW.

The storage units 31 to 33 do not always need to be provided in the distributed processing support apparatus 1, and may be an externally provided storage medium such as a USB memory, or a storage device such as a database server on the cloud. The distributed processing support apparatus 1 may access the database server on the cloud through the communication network NW to acquire and use the necessary data.

The processing unit 20 includes a hardware processor (not shown) such as a central processing unit (CPU) and microprocessing unit (MPU), and a memory such as a dynamic random access memory (DRAM) and a static random access memory (SRAM). As the necessary processing functions to carry out this embodiment, the processing unit 20 includes a source code acquisition unit 21, a source code partition unit 22, a deployment pattern candidate extraction unit 23, and an optimal pattern determination unit 24. These processing functions are realized by the processor executing the programs stored in the storage unit 30. The processing unit 20 may be realized in various manners, for example as an integrated circuit such as the application specific integrated circuit (ASIC) and field-programmable gate array (FPGA).

The source code acquisition unit 21 executes a process for acquiring the source code of the distributed processing target application via the communication interface unit 10. The source code acquisition unit 21 may be configured to receive the source code through the network NW from a management server (not shown) that manages the applications on the cloud, or to acquire the source code input by the system manager on an input device (not shown). The source code acquisition unit 21 further executes a process for extracting information concerning the target application based on the acquired source code and storing the information in the application information storage unit 31.

Following the partition rules stored in the partition rule storage unit 32, the source code partition unit 22 executes a process for identifying partitionable logics (functions and classes) from the source code acquired by the source code acquisition unit 21 and partitioning the source code in accordance with the identified logics.

The deployment pattern candidate extraction unit 23 executes a process for extracting deployment pattern candidates that have a possibility of being the optimal solution from the deployment patterns of the logics partitioned by the source code partition unit 22 and the deployment destination machines.

The optimal pattern determination unit 24 is configured to determine the optimal deployment pattern from the deployment pattern candidates extracted by the deployment pattern candidate extraction unit 23. The optimal pattern determination unit 24 includes an application performance measurement unit 241 and an optimal pattern selection unit 242.

The application performance measurement unit 241 executes a process for measuring or calculating the performance of the application (app) for each of the deployment pattern candidates extracted by the deployment pattern candidate extraction unit 23.

Based on the measured or calculated application performance, the optimal pattern selection unit 242 executes a process for selecting a deployment pattern delivering the optimal performance as the optimal deployment pattern.

(Operations)

The information prods sing operation of the distributed processing support apparatus 1 having the above configuration will be explained below. FIG. 3 is a flowchart showing the procedure and a description of the processing.

(1) Reception of Initiation Trigger

At step S1, the distributed processing support apparatus 1 monitors a trigger for initiating the process for determining the distribution and deployment of an application. Under this situation, an application developer or system manager inputs an initiation request for the distribution/deployment determination on the management terminal (not shown). Upon receipt of this initiation request as a trigger, the distributed processing support apparatus 1 executes the following operations.

(2) Acquisition of Source Code

At step S2, the distributed processing support apparatus 1 acquires at the source code acquisition unit 21 a source code of the distributed processing target application from the application management server (not shown) through the network NW under the control of the processing unit 20. The source code acquisition unit 21 sends the acquired source code to the source code partition unit 22, and stores the information relating to the source code or the application in the application information storage unit 31. The application related information includes the processing order of functions in the source code of the application, input data to the application, an input source machine, output data from the application, and an output destination machine. The source code of the application may be acquired from the management terminal that the application developer or system manager uses.

(3) Division of Source Code

At step S3, the distributed processing support apparatus 1 identifies at the source code partition unit 22, partitionable logics (such as functions and classes) in the acquired source code and partitions the source code into logics in accordance with the partition rules prestored in the partition rule storage unit 32, under the control of the processing unit 20.

(4) Extraction of Deployment Pattern Candidates

At step S4, the distributed processing support apparatus 1 executes at the deployment pattern candidate extraction unit 23 a process for extracting possibly optimal deployment patterns as deployment pattern candidates under the control of the processing unit 20. This process will be explained in detail below.

(4-1) Overview of Extraction Process

When the information concerning the processing order of the logics of the target application and the data input source and output destination machines is fixed, and if a reduced application processing time and a reduced communication volume among machines are aimed at, deployment patterns include some apparently non-optimal deployment patterns.

In the extraction of deploythent pattern candidates, the distributed processing support apparatus 1 according to the present embodiment removes these apparently non-optimal deployment patterns in advance based on the processing order of the logics of the application and the information concerning the input source machine that inputs data to the partition target application and the output destination machine to which the data from the application is output, thereby finding the optimal solution from essential patterns only. With such an extraction process, the number of deployment pattern candidates can be reduced without overlooking the optimal solution.

(4-2) Removal of Non-Optimal Deployment Patterns Based on Directed Graph

Figure 4:
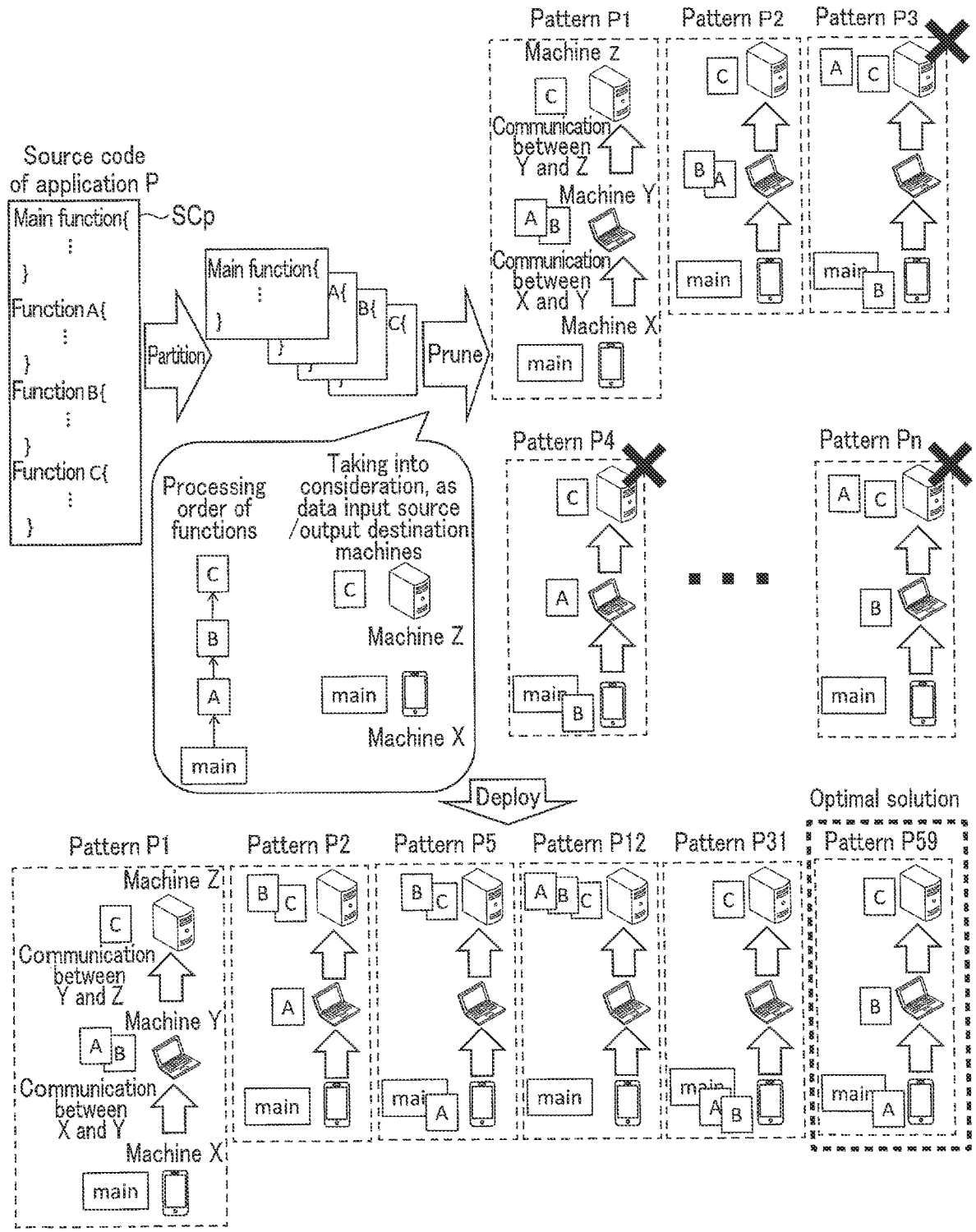
FIG. 4 is a schematic illustration of a processing flow of the distributed processing support apparatus illustrated in FIG. 2.

FIG. 4 is a schematic illustration of the processing flow of the distributed processing support apparatus 1 according to the present embodiment. The following explanation is presented on the assumption that the processing order of the logics (functions), the data input machine, and the data output machine have already been determined, and that the machdne Z, machine Y, and machine X demonstrate a higher computational capability in descending order (i.e., among the machines X, Y and Z, the machine Z demonstratingthe highest computational capability, and the machine X demonstrating the lowest computational capability).

In FIG. 4, the source code SCp of the application P is partitioned into the main function, function A, function B, and function C. These functions are determined to be processed in the order of the main, A, B, and C. The main function inputs data. This data enters the machine X (e.g., smartphone TD) serving as a data input source machine, and is output from the machine Z (e.g., cloud server CSV) serving as a data output destination machine. The machine y is a deployment candidate machine different from the machine X and machine Z for input/output use. The machine Y may be an edge server ESV.

A large number of deployment patterns P1 to Pn can be considered for the deployment of the partitioned functions to the machines, and among these deployment patterns, the optimal solution (pattern P59 in the example of FIG. 4) will be selected.

If the reduction of the entire processing time of the application is aimed at on the aforementioned assumption, the deployment pattern P3 is apparently not an optimal deployment pattern of the deployment patterns illustrated in FIG. 4. That is, in comparison with the deployment pattern P1 or P2, the deployment pattern P3 is such that the function B, which is supposed to be executed following the function A, is offloaded from the more computationally capable machine Z to the less computationally capable machine X. With the deployment pattern P3, the processing time will apparently increase with respect to the deployment pattern P1 or P2. For the same reason, the pattern P4 and pattern Pn can also be regarded as non-optimal deployment patterns and thus can be removed (pruned.)

In general, a deployment pattern that cannot be optimal (hereinafter referred to as "non-optimal deployment pattern") can be expressed in the manner indicated below.

<Non-Optimal Deployment Pattern>

The deployment Pattern will not be optimal if a graph of this deployment pattern created by connecting the machines in the function processing order with directed edges (hereinafter referred to as a "process flow graph") matches neither graph G1 nor G2 indicated below.

(G1) represents a shortest directed path group when the machine with the data input function installed (data input source machine) differs from the machine with the data output function installed (data output destinationmachine), where the data input source machine is determined to be the point of origin, the data output destination machine is determined to be the point of destination, and the shortest directed path group passes through each of the deployment candidate machines one or fewer times in ascending order of their computational capabilities;

(G2) represents a shortest directed cycle group when the data input source machine is the same as the data output destination machine, where the shortest directed cycle group passes through each of the deployment candidate machines one or fewer times in ascending order of their computational capabilities.

FIG. 5 roughly illustrates an exemplary determination of whether or not the deployment pattern is non-optimal. The shortest directed path group (directed paths 1 and 2, both corresponding to G1) of the deployment candidate machines and the process flow graph of the deployment pattern P3 in the example of FIG. 4 are shown in FIG. 5. The process flow graph of the deployment pattern P3 matches neither the shortest directed path 1 nor the shortest directed path 2 (nor does it correspond to G2) as shown in FIG. 5, and therefore the deployment pattern P3 is determined to be a non-optimal deployment pattern.

(4-3) Proof of Non-Optimal Deployment Pattern

The following proves that, in an environment where the logic processing order, data input source machine, and data output destination machine have already been determined, and where the reduction in the application processing time and in communication volume is aimed at, a deployment pattern that matches neither graph G1 nor G2 is not optimal.

[Assumption]

Figure 6:
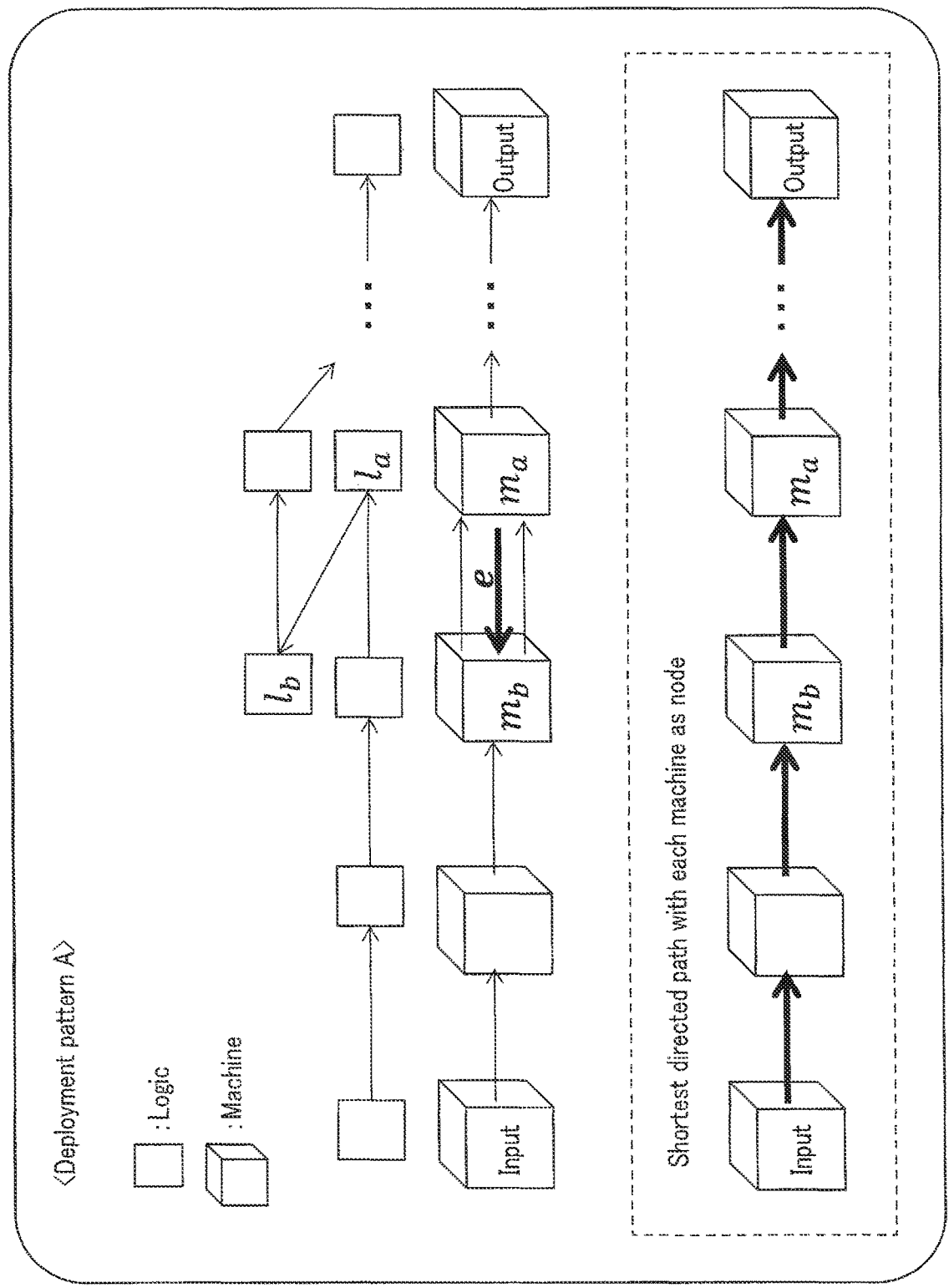
FIG. 6 is a diagram showing an exemplary non-optimal deployment pattern.

It is assumed that the deployment pattern A is the optimal solution, where the deployment pattern A has a process flow graph that matches neither the shortest directed path group nor the shortest directed cycle group that passes through each of the deployment candidate machines one or fewer times in ascending order of their computational capabilities, with the data input source machine determined to be the point of origin and the data output destination machine determined to be the point of destination. FIG. 6 shows an example of the deployment pattern A.

[Proof]

In the deployment pattern A of FIG. 6, M denotes a set of machines in which logics are installed. The process flow graph of the deployment pattern A matches neither the shortest directed path group nor the shortest directed cycle group, which means that the graph contains at least one directed edge e having a direction opposite the shortest directed path group or cycle group that includes the machines of the set M serving as nodes. Here, $l_a$ denotes a logic for transmitting data along this directed edge e, and $l_b$ denotes a logic for receiving this data. Furthermore, $m_a$ denotes a machine in which $l_a$ is installed (i.e., a machine corresponding to the point of origin of "e") and $m_b$ denotes a machine in which $l_b$ is installed, a machine corresponding to the point of destination of "e").

Figure 7:
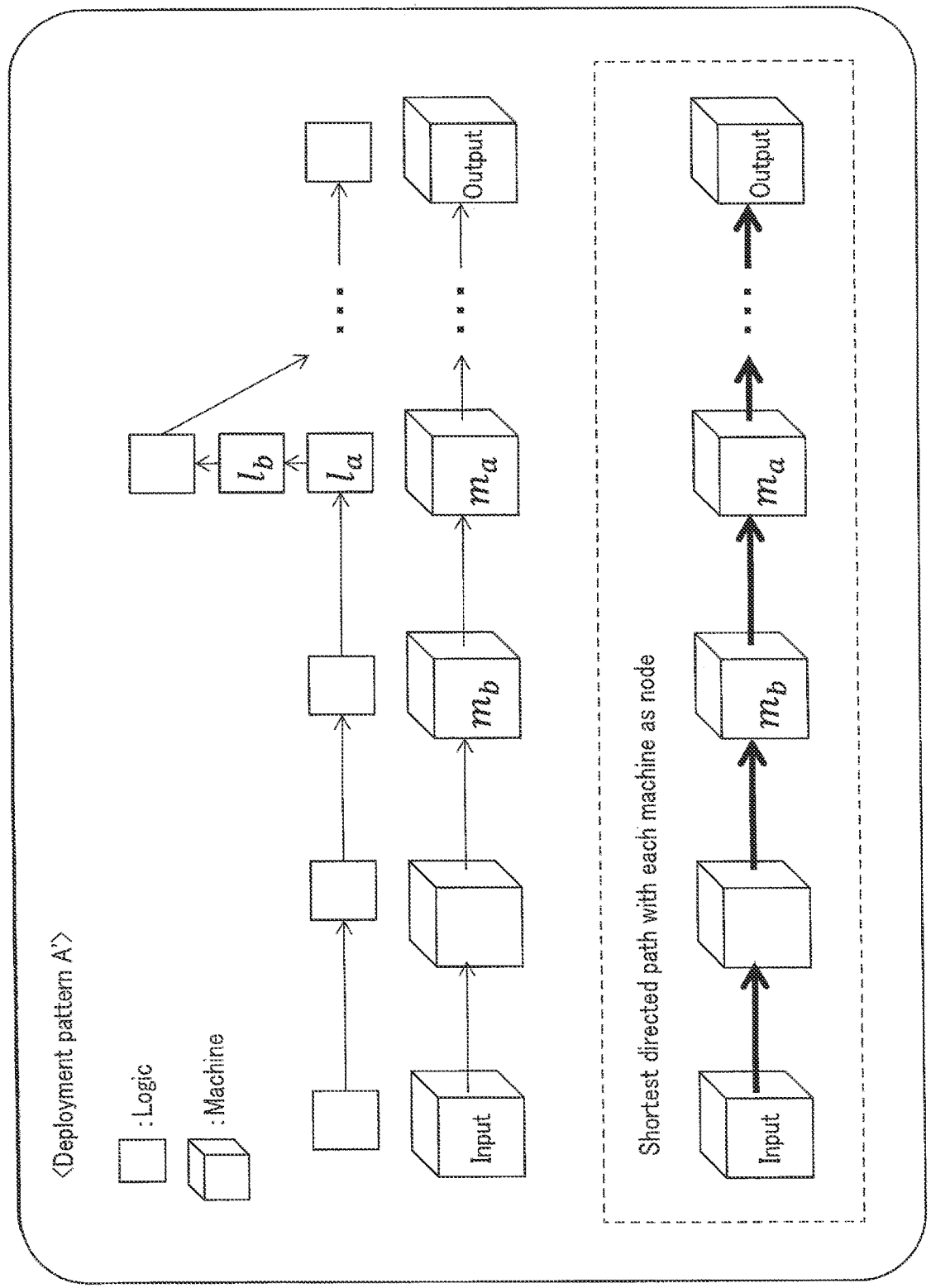
FIG. 7 is a diagram showing an exemplary deployment pattern that is possibly the optimal solution.

In order for the deployment pattern A to not include a directed edge e having an inverse direction, the logic $l_b$ is moved from the machine $m_b$ to the machine $m_a$, and the resultant deployment pattern will be referred to as deployment pattern A'. FIG. 7 shows an example of the deployment pattern A'.

In the shortest directed path or cycle, the machines are connected by directed edges in processing order, where $m_a$ demonstrates a higher computational capability than that of $m_b$. For this reason, in comparison with the deployment pattern A, the deployment pattern A' exhibits a shorter processing time of the logic $l_b$ and a communication volume that is smaller by the data flow volume flowing along the directed edge e. That is, the deployment pattern A', which exhibits a shorter processing time and a smaller communication volume than the deployment pattern A, contradicts the assumption that the deployment pattern A is the optimal solution.

In view of the above, if a deployment pattern has a process flow graph that does not match either one of the shortest directed path group or shortest directed cycle group that passes each of the deployment candidate machines one or fewer times in ascending order of their computational capabilities, with the data input source machine serving as a point of origin and the data output destination machine serving as a point of destination, this deployment cannot be considered to be an optimal deployment pattern (i.e., can be considered to be a non-optimal deployment pattern).

(4-4) Exemplary Algorithm

FIG. 8 shows an algorithm 1 as an exemplary algorithm used by the distributed processing support apparatus 1 according to the present embodiment to extract a deployment pattern that may possibly provide an optimal solution.

FIG. 9 shows the descriptions of the symbols used in the algorithm 1 of FIG. 8.

In the fifth and seventh lines of the algorithm 1 in FIG. 8, "comb (A, i)" denotes a calculation of combinations when the number i of elements are selected from set A. That is, according to the algorithm of FIG. 8, deployment patterns are extracted in the following procedure.

(i) The number of deployment candidate machines excluding the input source machine and output destination machine is ascertained (line 2).

(ii). The number i of machines are selected from the deployment candidate machines to deploy the logics other than $L_{IO}$ (logic group including the data input/output processing) (line 4). A combination of these machines to which the input/output machines are added will be referred to as $MC_i$ (lines 5 and 6). For instance, if 0 machines are to be selected from among the three deployment candidate machines X, Y and 2 excluding the input/output machines X and Z, $MC_0=\{(X, Z)\}$ is established, and if one machine is to be selected, $MC_1=\{(X, Y, Z)\}$ is established.

Figure 10:
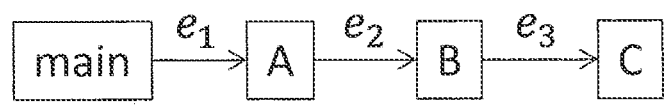
FIG. 10 is a diagram showing an exemplary data-flow graph explaining the algorithm of FIG. 8.

(iii) In the same manner as in the procedure (ii), i+1 edges are selected from the edges of the data-flow graph (graph connecting the functions by the directed edges in function processing order) (line 7). The selected edges will serve as the edges of the process flow graph of the extracted deployment pattern. FIG. 10 is a diagram showing an exemplary data-flow graph. When two edges are to be selected from the data-flow graph of FIG. 10, $EC_2=\{(e_1, e_2), (e_2, e_3), (e_1, e_3)\}$ is established.

Figure 11:
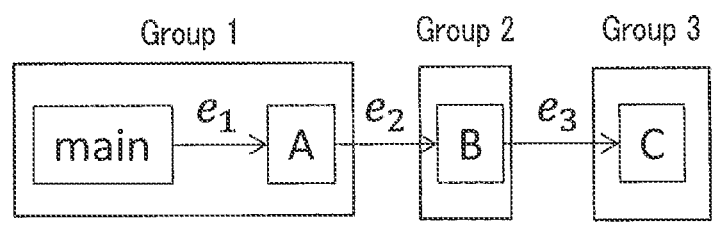
FIG. 11 is a diagram showing exemplary grouping that explains the algorithm of FIG. 8.

(iv) The logics serving as nodes of the data-flow graph are partitioned into a group of origin-side logics and a group of destination-side logics with respect to the edges of the data-flow graph selected in procedure (iii) (line 8). FIG. 11 shows an exemplary data-flow graph when $e_2$ and $e_3$ are selected. The logic (function) group in FIG. 11 is partitioned into group 1 on the origin side with respect to $e_2$, group 2 on the destination side with respect to $e_2$ (i.e., on the origin side with respect to $e_3$), and group 3 on the destination side with respect to $e_3$. This process is executed for each combination of the edges calculated in procedure (iii).

(v) Based on the assumption that the logics included in $L_{IO}$ are deployed only to the input source machine and output destination machine, the direct product of the combinations of machines obtained in procedure (ii) and the combinations of logics obtained in procedure (iv) is calculated to find deployment patterns. For instance, it is assumed that there are two combination patterns for machines, (X, Z) and (X, Y, Z), and six combination patterns for logics as indicated below:

(g1): (main), (A, B, C)
(g2): (main, A), (B, C)
(g3): (main, A, B), (C)
(g4): (main), (A), (B, C)
(g5): (main, A), (B), (C)
(g6): (main), (A, B), (C)

Then, the following six deployment patterns can be obtained:

(p1): (X, Z), ((main), (A, B, C))
  deploying the main function to machine X, while A, B and C to machine
(p2): (X, Z), ((main, A), (B, C))
  deploying the main and A to machine X, while B and C to machine
(p3) (X, Z) ((main, A, B) (C))
  deploying the main, A, and B to machine X, while C to machine
(p4): (X, Y, Z), ((main), (A), (B, C))
  deploying the main to machine X, while A to machine Y, and B and C to machine
(p5): (X, Y, Z) ((main, A), (B) (C))
  deploying the main and A to machine X, while B to machine Y, and C to machine
(p6): (X, Y, Z) ((main), (A, B) (C))
  deploying the main to machine X, while A and B to machine Y, and C to machine 2

(5) Determination of Optimal Deployment Pattern

After deployment pattern candidates are extracted in the above manner, at step S5 in FIG. 3, the distributed processing support apparatus 1 measures or calculates at the application performance measurement unit 241 of the optimal pattern determination unit 24, the application performance for each of the deployment pattern candidates when the distribution application is executed, under the control of the processing unit 20. According to the present embodiment, as the application performance, the application performance measurement unit 241 measures or calculates at least one of the time period required for the completion of the entirety of the processing of the application, traffic volume among the machines (information processing devices), and network delay among the machines.

Next, at step S6, the distributed processing support apparatus 1 determines, at the optimal pattern selection unit 242 of the optimal pattern determination unit 24, the deployment pattern producing the optimal performance to be the optimal deployment pattern, based on the measured or calculated application performance. For instance, based on the time period required for the entirety of the processing calculated by the application performance measurement unit 241, the optimal pattern selection unit 242 may select the deployment pattern having the shortest period as the optimal deployment pattern. Alternatively, the optimal pattern selection unit 242 may select the deployment pattern having the least traffic volume among the machines, or the least network delay among the machines, as the optimal pattern. The configuration of the optimal pattern determination unit 24 can be freely set by the system manager, and therefore the optimal deployment pattern that meets the purpose of the distributed processing system can be determined.

Figure 12:
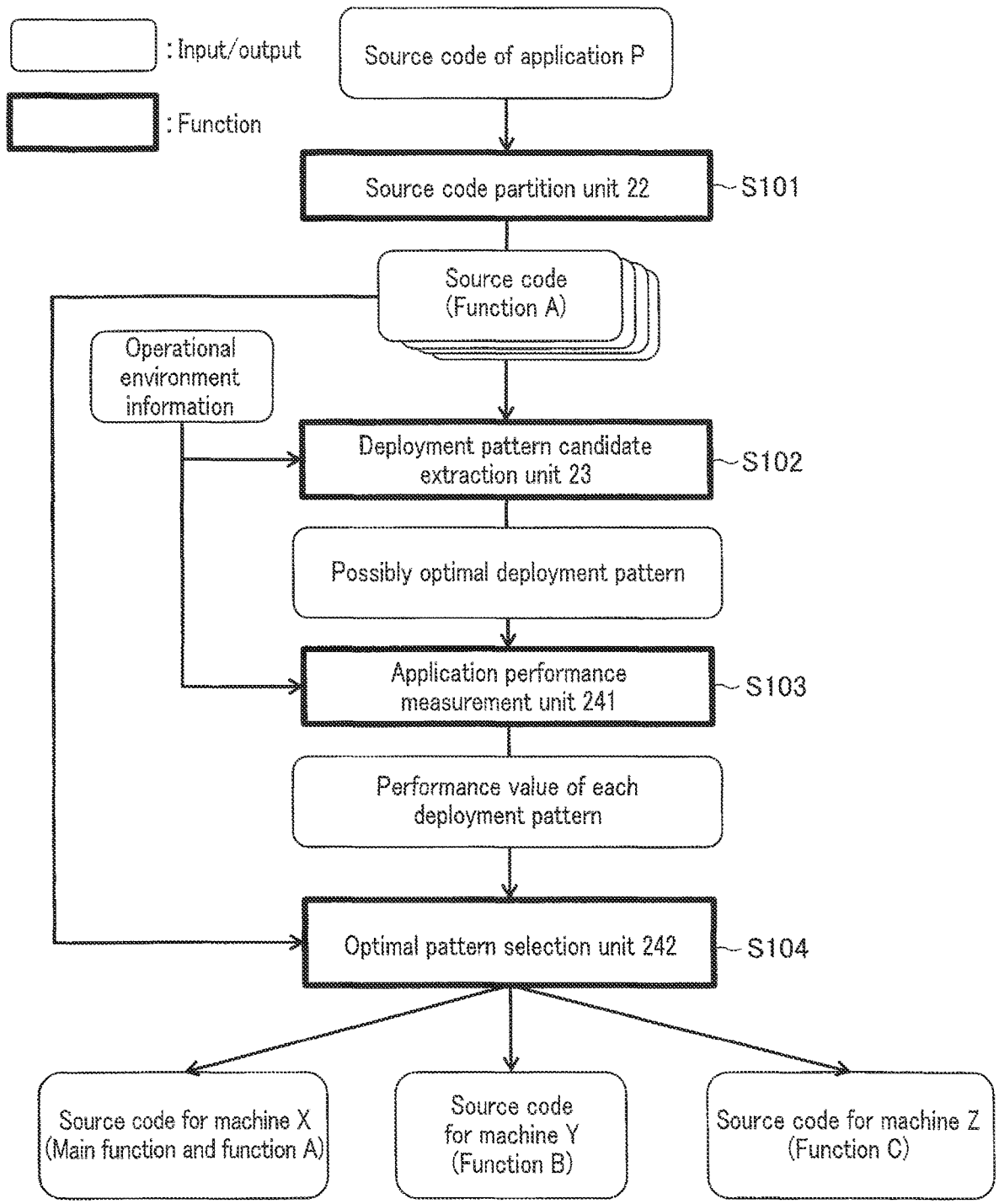
FIG. 12 is a block diagram showing the processing flow performed by the functional units of the distributed processing support apparatus illustrated in FIG. 2.

FIG. 12 shows the processing flow of the functional units for determining a deployment pattern which can improve the performance of the application.

First, at step S101, the distributed processing support apparatus 1 according to the present embodiment identifies logics (e.g., functions and classes) from the source code of the input application P, and partitions the source code in accordance with these logics, under the control of the source code partition unit 22.

Next, at step S102, the distributed processing support apparatus 1 extracts, as candidates, only deployment patterns demonstrating the possibility of being an optimal solution based on the partitioned logics and the information of the operational environment of the application (deployment candidate machines and their computational capabilities) under the control of the deployment pattern candidate extraction unit 23. Here, the algorithm 1 of FIG. 8 may be employed to extract the deployment patterns having the possibility of being the optimal solution so that non-optimal deployment patterns can be pruned.

At step S103, the distributed processing support apparatus 1 measures the application performance value at the runtime of the distribution application with each of the deployment patterns, under the control of the application performance measurement unit 241.

At step S104, the distributed processing support apparatus 1 explores only the extracted deployment patterns based on the measured application performance values, and selects the deployment pattern of logics exhibiting the highest performance, under the control of the optimal pattern selection unit 242.

In the example of FIG. 12, the deployment pattern with the main function and function A deployed to the machine X, function B deployed to the machine Y, and function C deployed to the machine Z is determined as the optimal solution, as in the optimal pattern P59 illustrated in FIG. 4.

(Verification of Effectiveness)

To verify the effectiveness of the above technique, a simulation test was conducted under the following environment.

Five deployment candidate machines are provided, with the input source machine having the lowest computational capability, and the output destination machine having the highest computational capability.

The partition/deployment target application includes 2 to 10 functions, which are sequentially called. The function including the input processing corresponds to the root of the data-flow graph, while the function including the output processing corresponds to a leaf of the data-flow graph.

The processing time of each function is randomly set in a manner such that the time period is shorter as the function installed in a machine has a higher computational capability. The communication volume among the functions is randomly set, and the communication delay among the machlnes increases as the communication volume increases.

In the above environment, the test was repeated a hundred times while changing the random number every time to calculate the average values of the following indicators.

(Indicator 1) Number of deployment patterns, i.e., the number of combinations of functions and deployment candidate machines (Indicator 2) Accuracy, i.e., ratio of optimal solution included in deployment patterns, where 1 is obtained when the optimal solution is included, and 0 is obtained when not included As comparative methods, the simple scheme (naive) of exploring all the deployment patterns, and simulated annealing (SA) (see Verbelen, Tim, et al., "Graph partitioning algorithms for optimizing software deployment in mobile cloud computing," Future Generation Computer Systems, vol. 29, No. 2, pp. 451-459, 2013) are adopted. With the simulated annealing, starting from a randomly selected initial solution, an exploration is conducted in the direction of improving the performance of this solution, and the solution obtained through a predetermined number of explorations is output as an approximate solution in this experiment, an evaluation is performed by setting the number of explorations in the simulated annealing to be the same as the number of deployment patterns of the present invention.

FIG. 13 is a diagram showing the comparative results of the indicator 1 with the simple scheme (naive) and with the proposed scheme (proposed) employing the distributed processing support apparatus 1 according to the present embodiment. The horizontal axis represents the number of functions, and the vertical axis represents the number of deployment patterns to be explored for the optimal exploration. As illustrated in FIG. 13, in comparison with the simple scheme (naive) with which all the deployment patterns are explored, the number of deployment patterns can be significantly cut down according to the proposed scheme (proposed). In particular, when there are 10 functions, a large number of deployment patterns are obtained: with the simple scheme (naive), the deployment patterns number 390,625; with the proposed scheme (proposed), on the other hand, 495 deployment patterns are obtained, reducing the number of deployment patterns by more than 99%.

Figure 14:
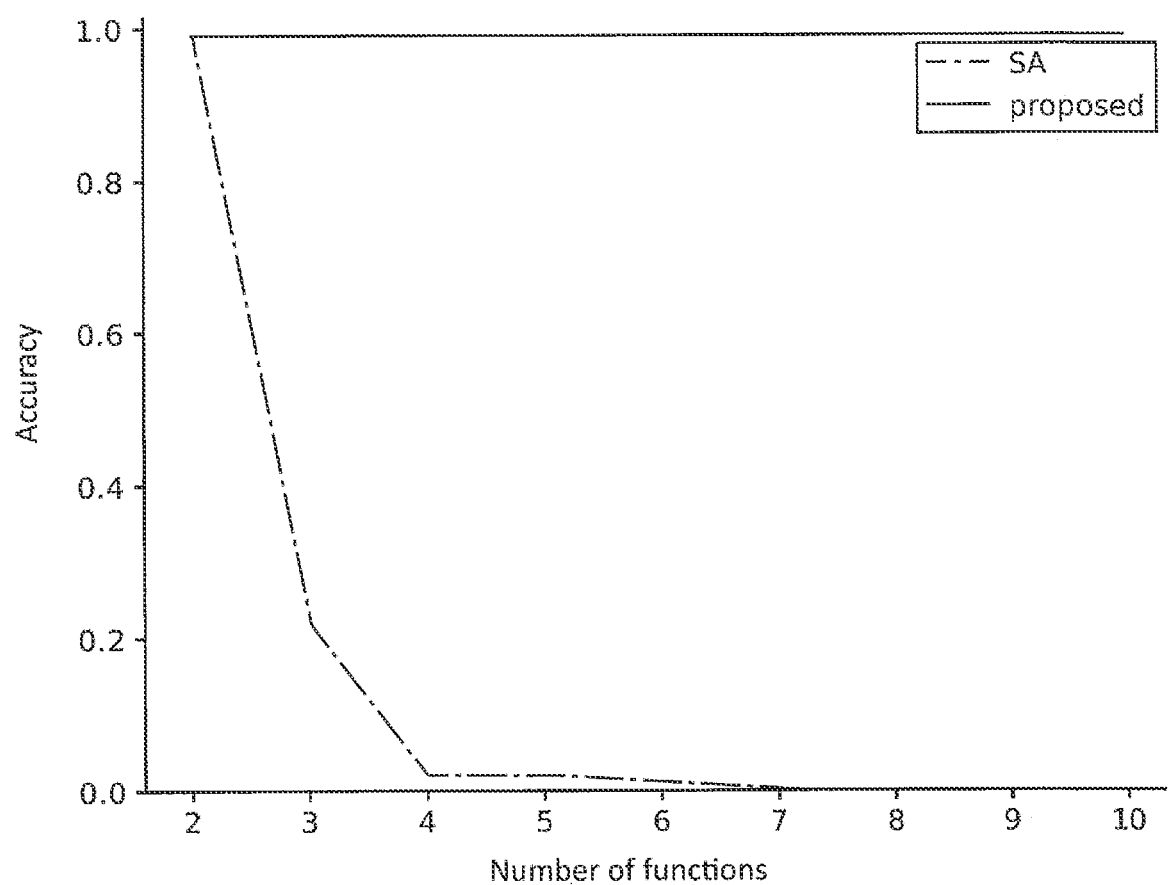
FIG. 14 is a diagram showing comparative results of the accuracy of the optimal exploration conducted on the distributed processing support apparatuses according to the conventional technique and the present embodiment.

FIG. 14 is a diagram showing the comparative results of the indicator 2 with the simulated annealing (SA) and with the proposed scheme (proposed) employing the distributed processing support apparatus 1 according to the present embodiment. The horizontal axis represents the number of functions, and the vertical axis represents the accuracy. As illustrated in FIG. 14, with the simulated annealing (SA), a high accuracy (1.0) is obtained when the number of functions is 2; however, the accuracy drops to 0.2 when the number of functions is 3, and further significantly drops when the number of functions is 4 or more. This shows that according to the simulated annealing (SA), the obtainment of the optimal solution becomes more difficult as the number of functions increases. In contrast, with the proposed scheme (proposed), an accuracy of 1 is maintained even when the number of functions is increased, and as verified above in (4-3), the optimal solution is obtained at every attempt.

The above embodiment is applicable to a data-flow graph including a cycle. For instance, the data-flow graph may be partitioned into multiple directed paths, and the above embodiment may be applied to each of the directed paths. In this manner, the number of deployment patterns can be reduced.

FIG. 15 shows an exemplary procedure of the present embodiment applied to a data-flow graph including a circuit. In this example, a data-flow graph FG1 with A serving as a point of origin and F serving as a point of destination includes a cycle that is diverted at B and merged at E. First, the data-flow graph FG1 is partitioned into two directed paths (directed paths 1' and 2') as illustrated in FG2. The embodiment is first applied to the directed path 1'.

As a result of the application of the present embodiment, the optimal deployment pattern P1' is determined for the directed path 1', as illustrated in FG3. In this example, A and B are deployed to the machines X; C, D, and E are deployed to the machine Y; and F is deployed to the machine Z. With the optimal deployment pattern P1 determined for the directed path 1', the data input source machine (machine for processing B) and data output destination machine (machine for processing E) are simultaneously determined for the directed path 2'. On the precondition of using this input source machine and output destination machine, the present embodiment is next applied to the directed path 2'. In the example of FIG. 15, in the directed path 2', B is deployed to the machine X, and E is deployed to the machine Y. In the diagram, G, H and I, whose deployment is yet to be determined in the directed path 2', are illustrated with broken lines.

As described above, even if the data-flow graph includes a cycle, the present embodiment is still easily applicable thereto.

(Effects)

As discussed above, according to the embodiment of the present invention, a source code of the application is acquired; the source code is partitioned into a plurality of logics; and based on a processing order of the logics of the application and information concerning operational environments of the information processing devices, deployment pattern candidates of the logics which are to be deployed in a distributed manner to any of the information processing devices are extracted. Then, an optimal deployment pattern for deploying the logics of the distribution application is determined from the extracted deployment pattern candidates.

In general, when the deployment problem of the logics of an application is to be solved as an optimization problem to improve the performance of the distribution application, the optimization of a solution is traded off against the number of to-be-explored deployment patterns. The conventional approximate method for calculating the optimal deployment pattern may realize a high-speed calculation, but the method does not ensure the optimality of the solution, which makes it difficult to acquire the optimal deployment pattern.

According to the present embodiment, to address this issue, the relationship among the processing order of the logics in the application, the computational capabilities of the deployment candidate machines, and objective functions for the application deployment is focused on, as a result of which the number of to-be-explored deployment patterns is considerably reduced, while the optimal solution is preserved in these to-be-explored deployment patterns. That is, only possibly optimal deployment patterns are extracted (or conversely, unlikely deployment patterns are removed (pruned)) to reduce the number of to-be-explored deployment patterns. Thus, without overlooking the optimal solution, the optimal application distribution and deployment can be quickly and efficiently calculated.

In addition, as mentioned earlier, the present embodiment is applicable to a data-flow graph including a cycle. The number of deployment patterns can be reduced, without overlooking the optimal solution.

Other Embodiments

The present invention is not limited to the above embodiments.

According to the present embodiment, the machines X, Y, and Z are described as exemplary deployment destinations of a distribution application. In particular, in the example of the present embodiment, the machine X is a terminal device TD such as a smartphone, the machine Y is an edge server ESV, and the machine Z is a cloud server CSV. This is not a limitation, however. The machine X, machine Y, and machine Z that serve as deployment destinations of the distribution application may all be cloud servers CSV, edge servers ESV, or smartphones. Alternatively, the machine X, machine Y, and machine Z that serve as deployment destinations of the distribution application may be any two of a cloud server CSV, an edge server ESV, and a smartphone.

The number of deployment destination machines is not limited to two or three, and any desired number can be determined to satisfy the desired level of the application performance.

Furthermore, the partition rules of a source code are not limited to the partition in units of functions defined by the application developer, and the source bode may be partitioned in larger or smaller units than any predetermined reference size.

Alternatively, the units 21 to 24 of the distributed processing support apparatus 1 may be arranged in a cloud computer, an edge router and the like in a distributed manner such that these devices can function through mutual cooperation to execute the above process.

In addition, the algorithm for extracting deployment pattern candidates that are likely to be the optimal solution may be modified in various manners within the gist of the present invention.

For instance, in one aspect of the above embodiment, the distributed processing support apparatus (1) configured to support distributed processing of an application on a plurality of information processing devices may include: a source code acquisition unit (21) configured to acquire a source code of the application; a source code partition unit (22) configured to partition the source code into a plurality of logics; a candidate extraction unit (23) configured to, based on a processing order of the logics of the application and information concerning operational environments of the information processing devices, extract deployment pattern candidates of the logics which are to be deployed in a distributed manner to any of the information processing devices; and an optimal pattern determination unit (24) configured to determine an optimal deployment pattern from the extracted deployment pattern candidates.

In the second aspect, the candidate extraction unit (23) according to the first aspect may remove a deployment pattern having a path that is not the shortest, using a directed graph that represents the information processing devices as nodes and a directed edge identifying a processing order of the logics in the application as a path, to extract the deployment pattern candidates.

In the third aspect, the candidate extraction unit (23) according to the first aspect may extract, using a directed graph that represents the information processing devices arranged in ascending order of computational capabilities as nodes and a directed edge identifying a processing order of the logics in the application as a path, deployment patterns having a shortest path as the deployment pattern candidates.

In the fourth aspect, the optimal pattern determination unit (24) according to the first aspect may include a performance measurement unit (241) configured to measure an application performance of each of the extracted deployment pattern candidates for an entirety of processing when the application is executed; and an optimal pattern selection unit (242) configured to select a deployment pattern providing best performance from the deployment pattern candidates based on a measurement result of the performance of the application.

In the fifth aspect, according to the fourth aspect, the performance measurement unit (241) may calculate, as the application performance, at least one of a time required for completion of the entire processing, a traffic volume between the information processing devices, and a network delay between the information processing devices.

According to the present embodiment, the distributed processing support apparatus for assisting the application distribution processing on multiple information processing devices partitions the source code of an application into multiple logics, extracts candidate deployment patterns of the logics to the information processing devices based on the processing order of the partitioned logics and information concerning the operational environment of the information processing devices, and determines the optimal deployment pattern from these candidates. Since deployment pattern candidates of the partitioned logics are extracted before determining the optimal deployment pattern, the determination of the optimal deployment pattern can be effectively made, in comparison with the determination of the optimal solution from the deployment patterns for all the possible combinations.

In addition, according to the present embodiment, a directed graph, which represents as nodes the information processing devices that serve as the deployment destinations of the partitioned logics and represents as directed edges the processing order of the logics, is employed to extract deployment pattern candidates while removing paths that are not the shortest. Since the paths not shortest and thus unlikely to be the optimal solution are removed (pruned), an effective, the optimal exploration can be realized with the reduced number of to-be-explored patterns, while preserving the deployment patterns that are possibly the optimal solution in the candidates.

According to the present embodiment, a directed graph representing information processing devices arranged in ascending order of their computational capabilities as nodes, and representing the processing order of the logics by directed edges, is employed to extract deployment patterns having the shortest path as deployment pattern candidates. As a result of extraction of the shortest path as a candidate by arranging the information processing devices in ascending order of their computational capabilities and using them as nodes of the directed graph, non-optimal solutions can be removed, with which offloading may occur, as the logic processing proceeds, from an information processing device with a high computational capability to an information processing device with a low computational capability. Thus, the optimal exploration can be efficiently conducted.

According to the present embodiment, the application performance is measured when the application is executed for each of the extracted deployment pattern candidates, and the optimal deployment pattern is Selected based on the measurement results. Since the optimal deployment pattern is selected from the extracted deployment pattern candidates based on the performance of the application, a highly reliable exploration for the optimal solution can be conducted.

According to the present embodiment, at least one of the time period required for the entirety of the processing, traffic volume among information processing devices, and network delay is measured as the application performance. Since the optimal deployment pattern is determined from the extracted deployment pattern candidates based on the processing time for the entire application, traffic volume, or network delay, a highly reliable exploration for the optimal solution can be conducted in accordance with the purpose of the distributed processing.

The specific embodiments have been explained above, which are merely to present examples, and not to restrict the scope of the invention. Indeed, the novel embodiments described in this specification can be realized in various other modes. In addition, various omissions, replacements, and modifications may be made to the embodiments described in the specification without departing from the scope of the invention. The attached claims and their equivalents intend to cover such modes and modifications included in the gist and scope of the present invention.

REFERENCE SIGNS LIST

1 Distributed processing support apparatus
10 Communication interface unit.
20 Processing unit
30 Storage unit
21 Source code acquisition unit
22 Source code partition unit
23 Deployment pattern candidate extraction unit
24 Optimal pattern determination unit
241 Application performance measurement unit
242 Optimal pattern selection unit
31 Application information storage unit
32 Partition rule storage unit.
33 Operational environment information storage unit

The invention claimed is:

1. A distributed processing support apparatus configured to support distributed processing of an application on a plurality of information processing devices, the apparatus comprising:
one or more processors; and
memory including instructions that, when executed by the one or more processors, perform to:
acquire a source code of the application;
partition the source code into a plurality of logics;
based on a processing order of the logics of the application and information concerning operational environments of the information processing devices, extract deployment pattern candidates of the logics which are to be deployed in a distributed manner to any of the information processing devices; and
determine an optimal deployment pattern from the extracted deployment pattern candidates,
remove a deployment pattern having a path that is not the shortest, using a directed graph that represents the information processing devices as nodes and a directed edge identifying a processing order of the logics in the application as a path, to extract the deployment pattern candidates,
the deployment pattern having the path that is not the shortest is a directed graph that does not match either one of a shortest directed path group or shortest directed cycle group that is passed one or fewer times in ascending order of computational capabilities.

2. The distributed processing support apparatus according to claim 1, wherein the instructions, when executed, further perform to:
measure an application performance of each of the extracted deployment pattern candidates for entire processing when the application is executed; and
select a deployment pattern providing best performance from the deployment pattern candidates based on a measurement result of the performance of the application.

3. The distributed processing support apparatus according to claim 2, wherein the instructions, when executed, further perform to
calculate, as the application performance, at least one of a time required for completion of the entire processing, a traffic volume between the information processing devices, and a network delay between the information processing devices.

4. A distributed processing support method executed by a distributed processing support apparatus configured to support distributed processing of an application on a plurality of information processing devices, comprising:
acquiring a source code of the application;
partitioning the source code into a plurality of logics;
extracting, based on a processing order of the logics of the application and information concerning operational environments of the information processing devices, deployment pattern candidates of the logics which are to be deployed in a distributed manner to any of the information processing devices; and
determining an optimal deployment pattern from the extracted deployment pattern candidates,
wherein the extracting incudes removing a deployment pattern having a path that is not the shortest, using a directed graph that represents the information processing devices as nodes and a directed edge identifying a processing order of the logics in the application as a path, to extract the deployment pattern candidates,
the deployment pattern having the path that is not the shortest is a directed graph that does not match either one of a shortest directed path group or shortest directed cycle group that is passed one or fewer times in ascending order of computational capabilities.

5. A non-transitory computer readable medium storing a computer program which is executed by a computer to provide the steps of:
acquiring a source code of an application;
partitioning the source code into a plurality of logics;
extracting, based on a processing order of the logics of the application and information concerning operational environments of a plurality of information processing devices, deployment pattern candidates of the logics which are to be deployed in a distributed manner to any of the information processing devices; and
determining an optimal deployment pattern from the extracted deployment pattern candidates,
wherein the extracting includes removing a deployment pattern having a path that is not the shortest, using a directed graph that represents the information processing devices as nodes and a directed edge identifying a processing order of the logics in the application as a path, to extract the deployment pattern candidates, and
the deployment pattern having the path that is not the shortest is a directed graph that does not match either one of a shortest directed path group or shortest directed cycle group that is passed one or fewer times in ascending order of computational capabilities.

6. A distributed processing support apparatus configured to support distributed processing of an application on a plurality of information processing devices, the apparatus comprising:

one or more processors; and memory including instructions that, when executed by the one or more processors, perform to:

acquire a source code of the application;

partition the source code into a plurality of logics;

based on a processing order of the logics of the application and information concerning operational environments of the information processing devices, extract deployment pattern candidates of the logics which are to be deployed in a distributed manner to any of the information processing devices; and determine an optimal deployment pattern from the extracted deployment pattern candidates, wherein the extraction includes extracting, using a directed graph that represents the information processing devices arranged in ascending order of computational capabilities as nodes and a directed edge identifying a processing order of the logics in the application as a path, deployment patterns having a shortest path as the deployment pattern candidates, and wherein the extraction of deployment patterns having the shortest path as the deployment pattern candidates includes removing non-optimal solutions, with which offloading may occur, as the logic processing proceeds, from an information processing device with a high computational capability to an information processing device with a low computational capability.

7. The distributed processing support apparatus according to claim 6, wherein the instructions, when executed, further perform to:

measure an application performance of each of the extracted deployment pattern candidates for entire processing when the application is executed; and select a deployment pattern providing best performance from the deployment pattern candidates based on a measurement result of the performance of the application.

8. The distributed processing support apparatus according to claim 7, wherein instructions, when executed, further perform to calculate, as the application performance, at least one of a time required for completion of the entire processing, a traffic volume between the information processing devices, and a network delay between the information processing devices.

9. A distributed processing support method executed by a distributed processing support apparatus configured to support distributed processing of an application on a plurality of information processing devices, comprising:

acquiring a source code of the application;

partitioning the source code into a plurality of logics;

extracting, based on a processing order of the logics of the application and information concerning operational environments of the information processing devices, deployment pattern candidates of the logics which are to be deployed in a distributed manner to any of the information processing devices; and determining an optimal deployment pattern from the extracted deployment pattern candidates, wherein the extracting includes extracting, using a directed graph that represents the information processing devices arranged in ascending order of computational capabilities as nodes and a directed edge identifying a processing order of the logics in the application as a path, deployment patterns having a shortest path as the deployment pattern candidates, wherein the extraction of deployment patterns having the shortest path as the deployment pattern candidates includes removing non-optimal solutions, with which offloading may occur, as the logic processing proceeds, from an information processing device with a high computational capability to an information processing device with a low computational capability.

10. A non-transitory computer readable medium storing a computer program which is executed by a computer to provide the steps of:

acquiring a source code of an application;

partitioning the source code into a plurality of logics;

extracting, based on a processing order of the logics of the application and information concerning operational environments of a plurality of information processing devices, deployment pattern candidates of the logics which are to be deployed in a distributed manner to any of the information processing devices; and determining an optimal deployment pattern from the extracted deployment pattern candidates, wherein the extracting includes extracting, using a directed graph that represents the information processing devices arranged in ascending order of computational capabilities as nodes and a directed edge identifying a processing order of the logics in the application as a path, deployment patterns having a shortest path as the deployment pattern candidates, wherein the extraction of deployment patterns having the shortest path as the deployment pattern candidates includes removing non-optimal solutions, with which offloading may occur, as the logic processing proceeds, from an information processing device with a high computational capability to an information processing device with a low computational capability.

* * * * *